United States Patent [19]

Rosa

[11] Patent Number: 4,683,527

[45] Date of Patent: Jul. 28, 1987

[54] AC/DC OR DC/AC CONVERTER SYSTEM WITH OUTBOARD COMMUTATION INDUCTORS

[75] Inventor: John Rosa, Penn Hills, Pa.

[73] Assignee: Westinghouse Electric Corp., Pittsburgh, Pa.

[21] Appl. No.: 896,027

[22] Filed: Aug. 13, 1986

[51] Int. Cl.⁴ .............................................. H02M 7/70
[52] U.S. Cl. ......................................... 363/5; 363/64; 363/126
[58] Field of Search .................. 363/1, 2, 5, 45, 64, 363/126

[56] References Cited

U.S. PATENT DOCUMENTS 4,255,784  3/1981  Rosa ..................................... 363/129
4,366,532  12/1982  Rosa et al. ............................. 363/69

FOREIGN PATENT DOCUMENTS 2227772  12/1972  Fed. Rep. of Germany .......... 363/5
3104397  8/1982  Fed. Rep. of Germany ......... 363/64
41830  3/1977  Japan ...................................... 363/5
945811  1/1984  United Kingdom ................ 363/126
813626  3/1981  U.S.S.R. .................................. 363/64
920995  4/1982  U.S.S.R. .................................. 363/5

Primary Examiner—William H. Beha, Jr.
Attorney, Agent, or Firm—C. M. Lorin

[57] ABSTRACT

In a 12-pulse AC/DC converter of the hexagon type the rectifier switches are distributed in three groups for each polarity and for each polarity three coils are joined to the common pole and connected separately to the pairs of rectifier switches of a corresponding group. As a result, the capability of the hexagon is extended to commutation of diodes, instead of controlled rectifier switches, by the effect of such interposed commutation inductance.

6 Claims, 11 Drawing Figures

AC/DC OR DC/AC CONVERTER SYSTEM WITH OUTBOARD COMMUTATION INDUCTORS

BACKGROUND OF THE INVENTION

The invention relates to an AC/DC or DC/AC converter system of the hexagon type. The Hexagon converter is a 12-pulse conversion circuit. If the 12 rectifying devices of such hexagon converter are diodes, the converter is suitable for AC/DC conversion only and it delivers a fixed DC voltage to its load. If the 12 rectifying devices are thyristors (or other controlable devices), the converter can perform on an AC/DC system, as well as on a DC/AC system. Moreover, it delivers, then, a controllable DC voltage. It is fully described in U.S. Pat. No. 4,255,784. The main attribute of the Hexagon circuit is that it can meet stringent specifications of the harmonic content of AC input currents drawn by the converter from the AC supply lines. Other 12-pulse converter circuits cannot meet most of these specifications without additional filtering circuits.

The harmonic performance of the Hexagon circuit hinges on the effective inductances which determine the commutation overlap angle $\mu$ of its semiconductor switches. The required commutation inductances can be designed into the Hexagon transformer in the form of leakage inductances, or can be provided externally in the form of "outboard" inductors. The preferred solution depends upon the rating of the converter as well as upon the specific size, weight and efficiency requirements.

An outboard inductor scheme which employs only two magnetic components to provide the equivalent of the required twelve commutation inductances is described in detail in U.S. Pat. No. 4,366,532.

However, the outboard inductor scheme there described in the cited patent is applicable without limitations only to converters which have controlled semiconductor switches. These switches (usually thyristors) start to conduct and initiate commutation of the preceding switch in the commutation sequence, when they are forward biased and when they receive the proper gate signal.

If the converter circuit is a diode rectifier, the outboard inductor scheme encounters limitations. Because diodes are not controllable semiconductor switches, the afore-mentioned outboard inductor scheme effects harmonic reduction only for commutation overlap angles $\mu$ not exceeding 30°. In most instances, however, this is not sufficient because, in order to achieve the specified harmonic performance, the required overlap angle $\mu$ at maximum output current (resulting in the largest overlap angle) falls in the range of 30° to 45°.

The problem arising with diode rectifiers in an Hexagon converter is solved according to the invention with an outboard inductor scheme which affects the commutation in such a way that an "illegitimate" commutation by an incoming diode cannot start at overlap angles less than the acceptable minimum.

SUMMARY OF THE INVENTION

The invention resides in dividing the 12 rectififer devices of a hexagonal, AC/DC, or DC/AC converter, into two sets of 6 units for the respective polarities, the 6 units of each set being consecutive in the sequential order of commutation from one phase to the next, then, in dividing, in each set, the 6 units into 3 successive pairs each pair encompassing one unit of each of the other two pairs. Three inductors are provided for each set, each inductor being connected to one pair of rectifying devices on one side, and to the associated pole on the other side. As a result, two inductors which are consecutive, in the succession of the rectifier devices in the commutaion process, are effective to reduce the rate of change of the commutating currents in both of the commutating devices, thereby to extend the duration of the attending commutation period and also to cause a delay in forward biasing in the succeeding devices of the same set, thereby preventing the latter from interfering with the commutation in the two communicating devices.

The effect of the inductor is the same as in the aforestated U.S. Pat. No. 4,255,786. However, as explained hereinafter, with the arrangement according to the present invention, this solution is effective with operating DC output currents which otherwise would entail a commutation overlap exceeding 30°. Therefore, the AC/DC converter according to the present invention is effective with diodes as well as with controlled rectifier devices.

DETAILED DESCRIPTION OF THE INVENTION

Figure 1:
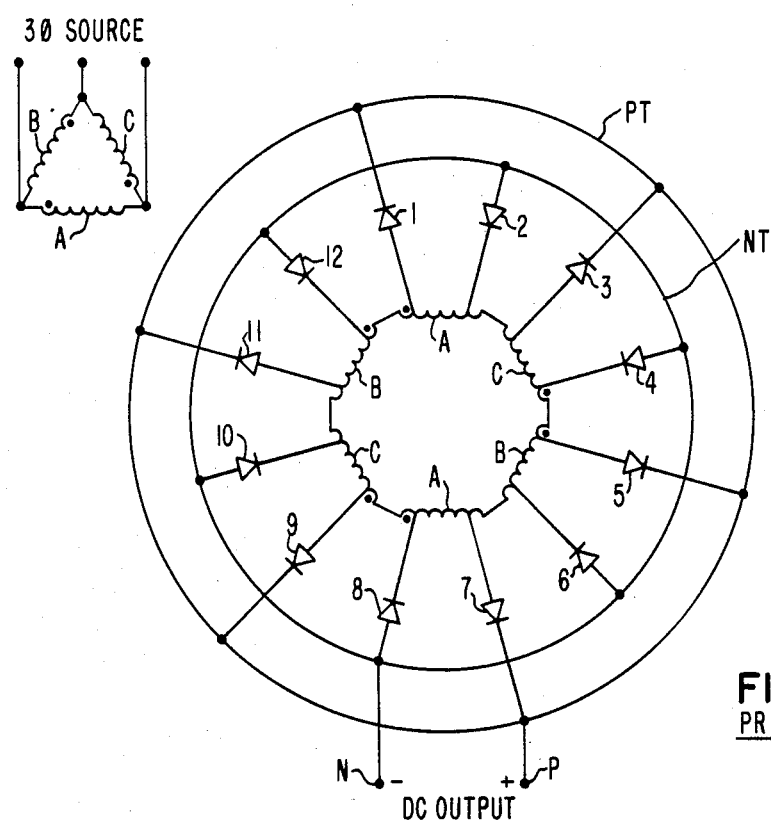
FIG. 1 shows a hexagon converter typical of the prior art.

FIG. 1 shows a 12-pulse AC/DC conversion circuit, of the hexagon type, using diodes as rectifying devices, as described in U.S. Pat. No. 4,255,784. For the purpose of this description, U.S. Pat. No. 4,255,784 is hereby incorporated by reference.

Figure 2:
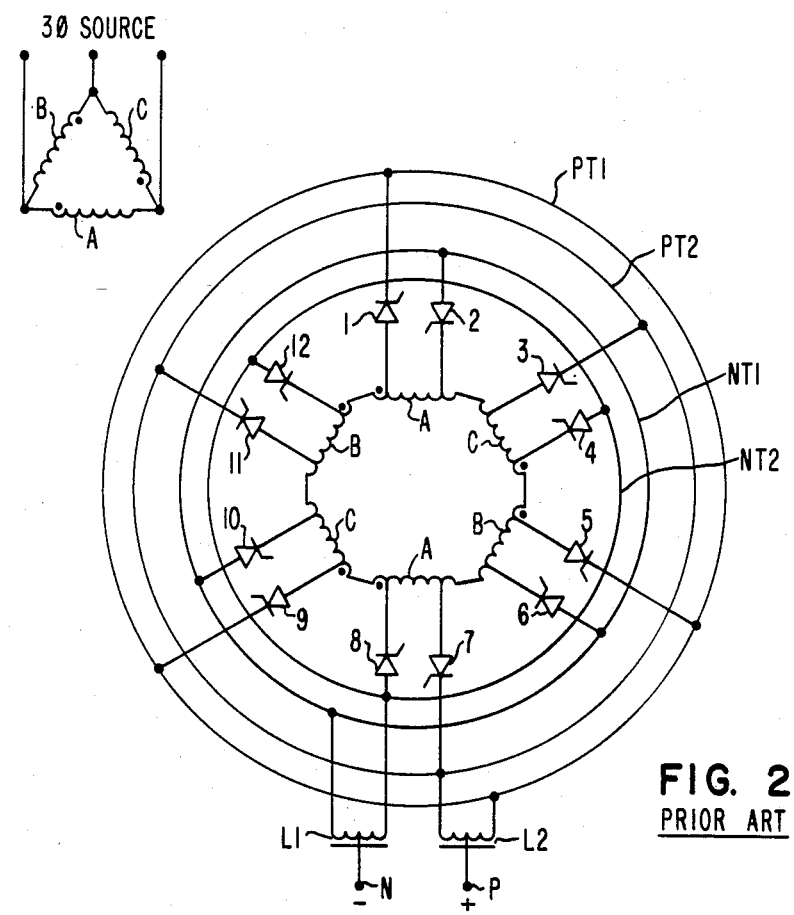
FIG. 2 shows the use of two inductances, one for each polarity side, to improve the harmonics quality of the twelve pulse AC/DC conversion circuit of FIG. 1 as disclosed in U.S. Pat. No. 4,366,532.

FIG. 2 shows the AC/DC converter of FIG. 1 provided with two external commutation inductances (L1 for the negative side, L2 for the positive side) which serve to complement the commutation inductances designed within the hexagon transformer in the form of leakage inductances according to the teachings of U.S. Pat. No. 4,366,532. For the purpose of this description, U.S. Pat. No. 4,366,532 is hereby incorporated by reference.

In FIG. 1, the three phase primary AC source has phases A, B, C, coupled to the respective secondary windings A, B, C of the an hexagon type converter. The twelve rectifier switches 1 through 12 are alternately interconnecting one tapping point of the winding of the hexagon with one terminal of the opposite polarity (1, 3, 5 . . . through terminal PT for the positive pole, 2, 4, 6 . . . through terminal NT for the negative pole) at the DC output.

FIG. 2 shows the same three-phase primary AC source and hexaganol winding as in FIG. 1. Here, instead of one terminal (PT, or NT) per pole (P,T) there are two terminals (PT1, PT2 and NT1, NT2) per pole (P,T), and the corresponding series of alternate rectifier switches (1–12) is divided into four groups, two groups being associated with one pole and the two terminals thereof (1, 5, 9 and 3, 7, 11, respectively for the positive P), the two other groups being associated with the other pole and the two terminals thereof (2, 6, 10 and 4, 8, 12, respectively for the negative polarity N). Across each pair of terminals of the same polarity is placed an inductance (L1 for the negative side, L2 for the positive side) having a midpoint connected to the DC terminal proper.

Figure 3A:
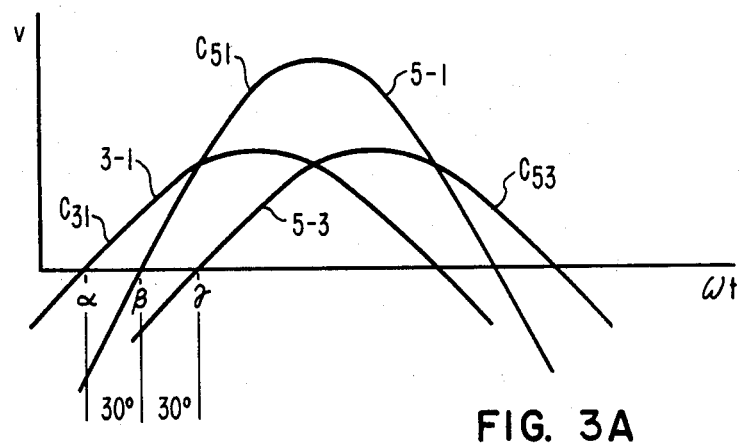
FIG. 3A illustrates with curves the operation of the commutation inductances of FIG. 2.
Figure 3B:
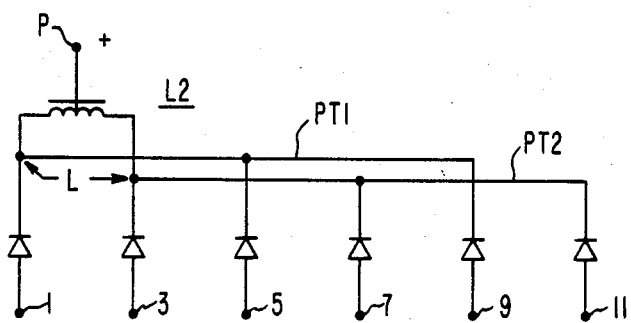
FIG. 3B schematically shows one of such two inductances for the positive polarity side in relation to the rectifying devices thereof.

FIG. 3A shows in relation of FIG. 3B, illustratively, how inductance L2 (positive polarity) is working with a pair of commutating rectifiers.

The problem arises when the rectifier switches are diodes, thus, not controllable devices. Since a commutation event takes place within one set of diodes, positive or negative, it suffices to examine one the operation of the other set is identical, except that the events occur with a 30° phase shift. FIG. 3B shows the "positive" diode group of FIG. 2 and the associated commutation inductor L2 placed outboard. The diodes commutate one another in the sequence indicated, namely 1, 3, 5, 7, 9, 11, then from the diode 11 to diode 1, etc. It can be seen that between each pair of diodes participating in the commutation process (e.g. 1-3, 3-5, 5-7, etc. ) the commutation inductance has a value L combining the two half windings of L2 which is inserted in the commutation path. The delaying effect of inductance L results in the desired commutation overlap angle $\mu$ and a corresponding reduction in the AC line current harmonics. During commutation, the remaining diodes are supposed to be reverse-biased and to behave like open switches. This criterion is satisfied as long as $\mu < 30°$. This appears from the voltage waveforms shown in FIG. 3A.

Assuming diode 1 is conducting, diode 3 is "next" in the sequence to commutate diode 1. Commutation will start at instant $\omega t = \alpha$ a when the (3-1) "commutation" voltage V turns positive (curve $C_{31}$) and forward biases diode 3. Inductor L2 is, then, inserted in the commutation path between diodes 1 and 3 causing the desired commutation overlap.

If the commutation overlap lasts less than 30°, all other diodes in the positive set remain reverse biased and will stay out of conduction. After the commutation is completed (at instant $\omega t < \beta$), diode 3 will conduct alone in the positive set. Commutation of diode 3 by diode 5 starts at instant $\omega t = \gamma$ when the 5-3 voltage turns positive (curve $C_{53}$) and forward-biases diode 5. Again, inductor L2 is in the commutation path between diodes 3 and 5.

If the commutation overlap between diodes 3 and 1 lasts longer than 30°, at instant $\omega t > \beta$ diode 5 becomes forward biased by the voltage 5-1 appearing between the anodes of diode 5 and 1 (curve $C_{51}$). Thus, while diode 3 in the process of commutating diode 1 through inductor L2, diode 5 will also begin to conduct and commutate diode 1. This occurs, however, without the benefit of having the inductance L2 in the commutation path. The result is that diode 5 will instantly take over conduction from diode 1. Since at that time voltage 5-3 is negative, diode 3 will attempt to commutate diode 5 until the 5-3 voltage reverses polarity at instant $\omega t = \gamma$. The original commutation sequence is totally altered. This occurrence does not constitute a malfunction, but it does increase the harmonic content of the AC line currents and it defeats the purpose of the outboard inductor scheme. It can be readily seen that if the switches are gate-controlled, rather than diodes, this "illegitimate" commutation will not take place provided no gate pulse is delivered before the legitimate commutation is allowed to begin (i.e. before the respective commutation voltage changes polarity).

Figure 4:
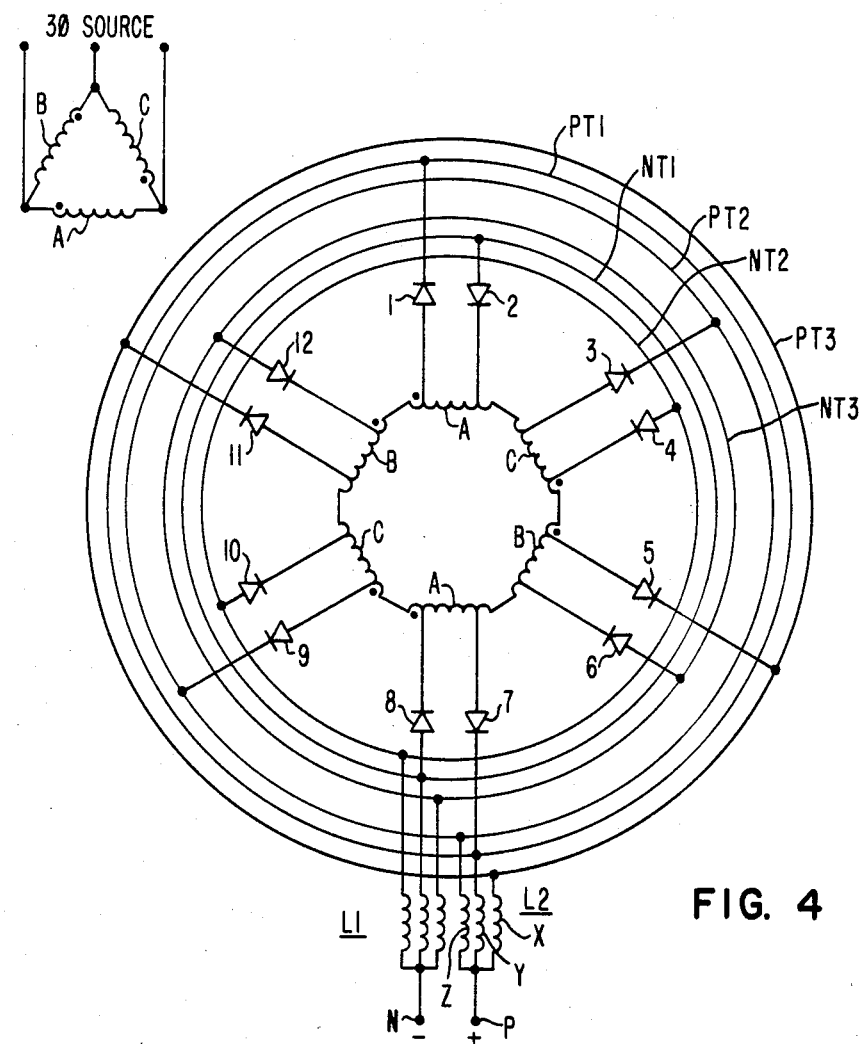
FIG. 4 shows the use of three inductances for each polarity side in the hexagon converter of FIG. 1.

Referring to FIG. 4, the present invention proposes a totally different inductor scheme so as to overcome this problem. In this configuration two outboard inductors group L1, L2 are now wound each on three-legged cores (three single-phase cores are also acceptable, although less practical).

It is generally understood from the state of the art that three inductors forming a group as X, Y, Z in FIG. 4 for the positive pole P (as one group) or X, Y, Z for the negative pole N (as the other group) may be arranged by being either wound on a 3-legged iron core, or on individual iron cores, or without iron as shown in FIG. 4, but being magnetically coupled.

Figure 5A:
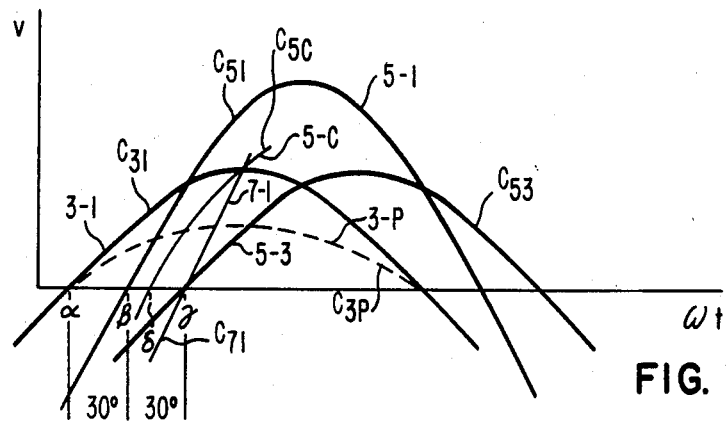
FIG. 5A illustrates with curves the operation of the commutation inductances of FIG. 4.
Figure 5B:
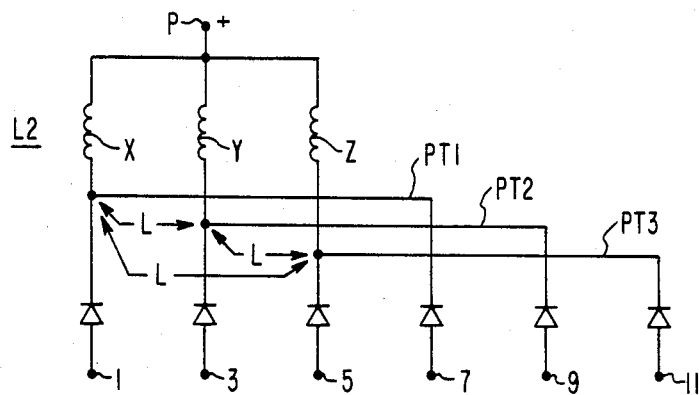
FIG. 5B schematically shows the three inductances for the positive side in relation to the rectifying devices.

Operation of the circuit is illustrated by FIGS. 5A and 5B.

In FIG. 2 the two sets of switches associated with the positive pole were connected to terminals PT1 and PT2, respectively, while the two sets of switches associated with the negative pole were connected to terminals NT1 and NT2, respectively. Inductor L1 was between NT1 and NT2, and inductor L2 was between PT1 and PT2.

In FIG. 4, there are three sets of switches for each polarity and three DC terminal: PT1 (for diodes (1, 7); PT2 (for diodes 3, 9) and PT3 (for diodes 5, 11) on the positive side; NT1 (for diodes 2, 8); NT2 (for diodes 4, 10) and NT3 (for diodes 6, 12) on the negative side. For the same pole, three inductors are provided having a common end to the pole (P or N) and having separate ends connected to the respective three terminals. Thus, L1 is a group of three inductors X, Y, Z going to NT1, NT2 and NT3, while L2 is a group of three inductors X, Y, Z going to PT1, PT2 and PT3. The operation of the circuit of FIG. 4 is illustrated by FIGS. 5A and 5B. FIG. 5B shows the three coils X, Y, Z of inductance L2 associated with the positive pole P at a common end, and the three terminals PT1, PT2 and PT3 with their respective pairs of diodes (1, 7) (3, 9) and (5, 11) respectively.

FIG. 5A shows: the voltage between the anode of diode 3 and the positive terminal (curve $C_{3P}$); the voltage between the anodes of diode 3 and diode 1 (curve $C_{31}$); the voltage between diode 5 and diode 1 (curve $C_{51}$); the voltage between diode 5 and diode 3 (curve $C_{53}$) and between diode 7 and diode 1 (curve $C_{71}$). FIG. 5A also shows the anode to cathode voltage across diode 5 (curve $C_{5C}$) while diode 3 is commutating diode 1.

Assuming again that diode 1 is conducting, diode 3 will begin to commutate diode 1 at $\omega t = \alpha$ when the 3-1 voltage (Curve $C_{31}$) turns positive. Commutation not takes place through the (X+Y) coils of inductor group L2. The two coils of identical inductance act as voltage divider. Therefore, voltage (3-P) between the anode of diode 3 and positive pole P (curve C$_{3P}$) is half the voltage (3-1). The voltage across diode 5 is 5-C (C for cathode), where 5-C=(5-3)+(3-P).

As shown in FIG. 5A, the (5-C) voltage across diode 5 changes polarity at $\omega t=\delta$, where $\delta=40.9°$. Thus, "illegitimate" commutation by diode 5 cannot start at overlap angles not exceeding 40.9°. Even if the overlap angle exceeds this value, the third winding Z in the group is in the commutation path and no abrupt commutation can take place. As can be seen, diode 7, next in the commutation sequence remains reverse-biased until $\omega t=\gamma$ (see voltage 7-1) and there is no danger of illegitimate commutation by diode 7 either, even though it has a common cathode connection with diode 1.

Figure 6:
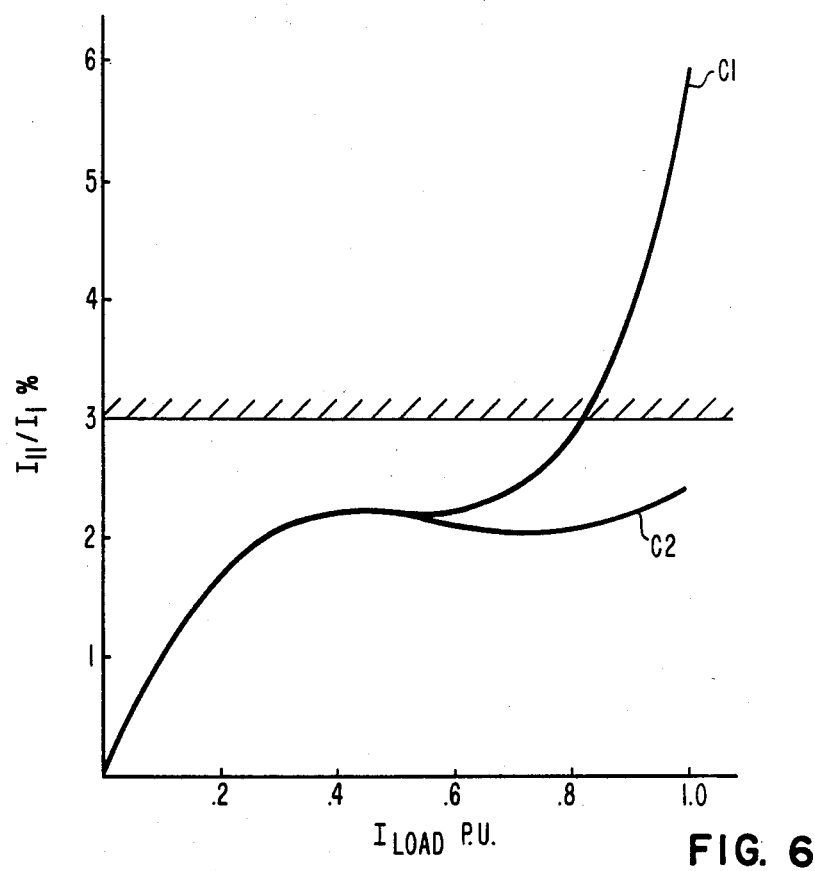
FIG. 6 compares with curves the proportion of the eleventh harmonic with the scheme of FIG. 4 as opposed to the scheme of FIG. 2.

Experimental results obtained on a 4.8 kW Hexagon diode rectifier are shown in FIG. 6. Harmonic line currents were measured at varying loads, first using the old outboard inductor scheme, then the new scheme. The amplitude of the 11th harmonic of the AC line current is shown as a percent of the fundamental AC line current at 1 p.u. load, considering that the 11th harmonic is the largest harmonic present, all other harmonics are substantially smaller.

The normalized value of the commutation inductances used was $(I_{load\ nom} \times \omega L_{com})/V_{dnl}=11.4\%$, where $I_{load\ nom}$ is the nominal DC load current, $L_{com}$ is the effective commutation inductance and $V_{dnl}$ is the no-load DC voltage. Because of this inductance, the commutation overlap angle $\mu$ exceeds 30° above 0.6 p.u. load. It can be seen that above 0.6 p.u. load the performance of the old outboard inductor scheme (curve C1) rapidly deteriorates while the new scheme (curve C2) maintains the 11th harmonic below 2.5%. Most specifications stipulate 3% maximum, this level being indicated by a shaded line.

The outboard inductor scheme according to the present invention ensures good harmonic performance with diode rectifiers where the fore-stated prior art was inadequate. At the same time it preserves the advantages of the prior art scheme of "multiplexing" the outboard inductors, thereby saving on magnetic hardware. As a result, the outboard approach becomes equally viable for either a thyristor converter or a diode rectifier. At power levels below approximately 500 kW, the outboard approach being the preferred option for most applications, the invention contributes significantly in allowing the full use of the Hexagon converter.

Figure 7A:
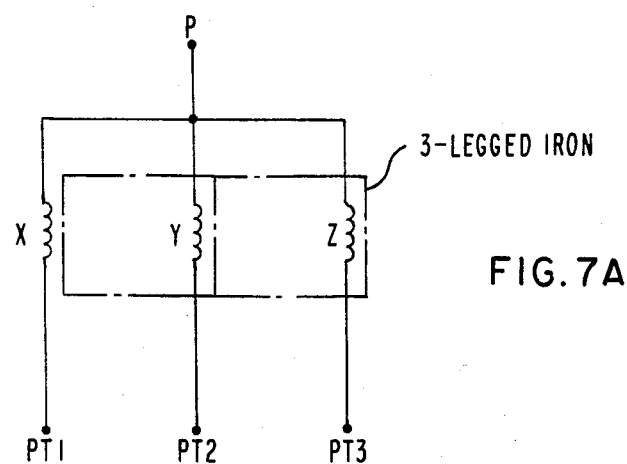
FIGS. 7A–7C illustrate three possible ways of grouping the three inductors associated with one pole according to FIG. 4.
Figure 7B:
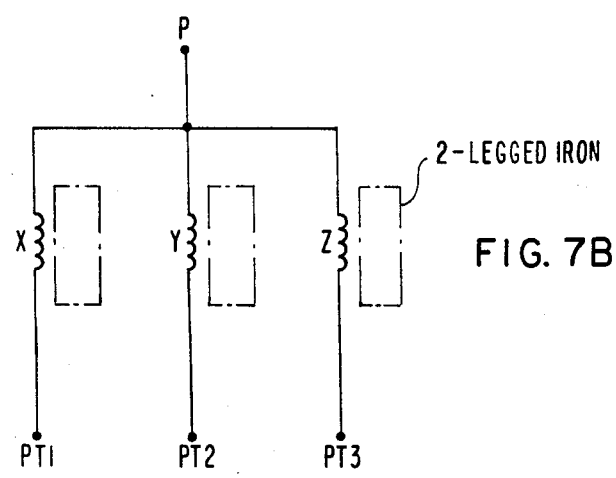
Figure 7C:
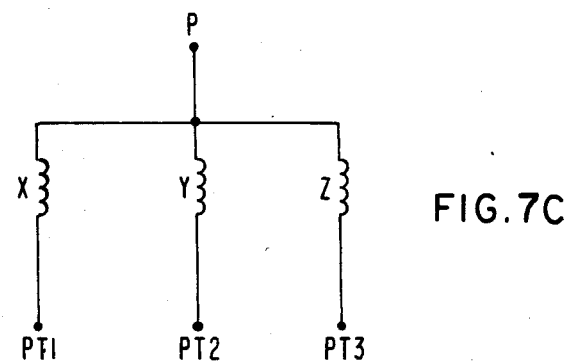

The two groups of inductors X, Y, Z shown in FIG. 4 may be arranged as generally known in the art for an iron-core or for an air-core coil. Illustratively, FIG. 7A shows the three coils X, Y, Z mounted on a common three-legged iron. FIG. 7B shows the three coils X, Y, Z mounted on individual and respective two-legged irons. FIG. 7C shows three coils X, Y, Z which are simply air-core coils.

I claim:

1. In an AC/DC converter system interconnecting AC phase lines with two direct current (DC) terminals defining opposite poles for such converter, the converter system including 12 rectifying devices equally distributed about twelve successive phase voltages oriented vectorially in a star-fashion and at 30 degrees to one another;
   one set of 6 of said rectifying devices being associated with one DC terminal, a second set of 6 of said rectifying devices being associated with the other DC terminal;
   said rectifying devices becoming operatively conducting between said DC terminals in cyclic sequential order so that two commutating devices are commutating one another from one phase voltage to the next phase voltage at 60 degrees phase shift;
   the combination of:
   in each of said two sets of rectifying devices three pairs of rectifying devices are arranged in a staggered fashion so that one rectifying device of a pair is next in said sequential order of conduction relative to another rectifying device of another pair;
   while being associated with a rectifying device ranking third in said sequential order and belonging to the third pair of such set;
   a group of three inductors being provided for each of said sets of rectifying devices, each such group being connected between the associated pole and the respective pairs of rectifying devices;
   two inductors of a group being operatively associated with the two commutating rectifying devices in said sequential order;
   the other inductor of said group being associated with the third rectifying device which is in sequential order relative to said two commutating rectifying devices;
   such two inductors of a group being effective to reduce the rate of change of the commutating currents in both of said two commutating rectifying devices so as to extend the duration of the attending commutation and reduce the harmonics of the currents drawn from said phase lines, and said pair of inductors being effective via said other inductor of said group to prevent interference by said third rectifying device upon the commutation of said commutating devices.

2. The converver system of claim 1 with said rectifying devices benig diodes.

3. The converter system of claim 1 with said inductors of a group being coupled magnetically.

4. The converter system of claim 1 with said 3 inductors in each group being wound on a 3-legged iron core.

5. The converter system of claim 1 with said 3 inductors in each group being wound on individual iron cores.

6. The converter system of claim 1 with said 3 inductors in each group being air-cored inductors.

* * * * *